March 31, 1942.  H. BERG  2,278,054
FLOATING REAMER
Filed Feb. 15, 1940
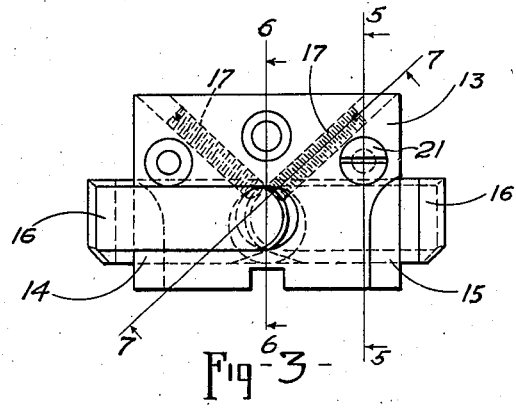
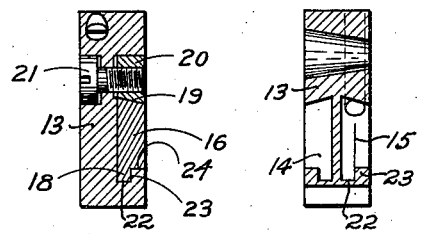
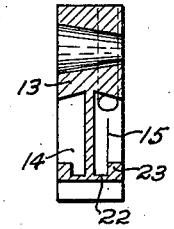
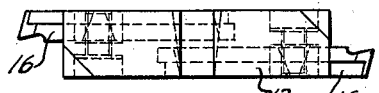
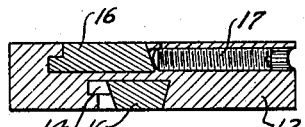
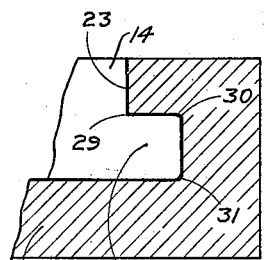
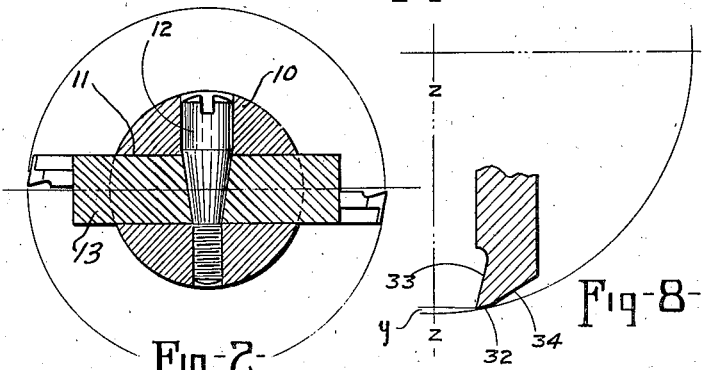
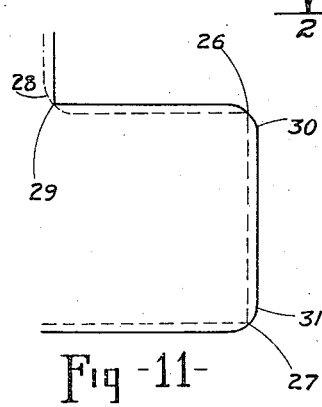
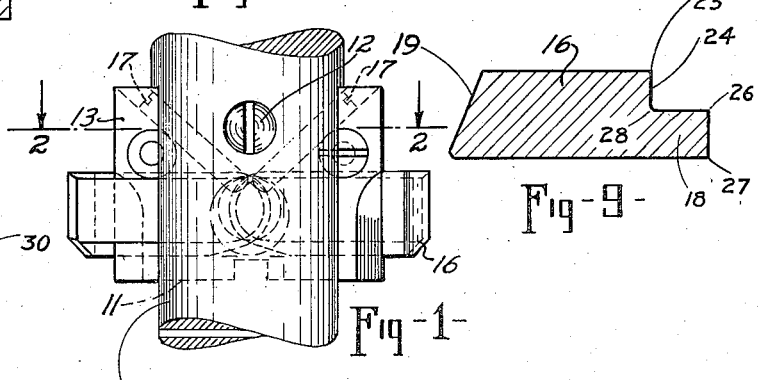
INVENTOR.
HERMAN BERG
BY Richey & Watts
ATTORNEYS Patented Mar. 31, 1942

2,278,054

UNITED STATES PATENT OFFICE 2,278,054

FLOATING REAMER

Herman Berg, Cleveland, Ohio, assignor to The Kelly Reamer Company, Cleveland, Ohio, a corporation of Ohio Application February 15, 1940, Serial No. 319,060

1 Claim. (Cl. 77—56)

This invention relates broadly to floating reamers and more specifically to improvements in the cutter holders therefor.

One of the objects of the invention is to provide a tool holder which is organized to support the cutter blades in such a manner as to facilitate the withdrawal of the reamer from the work without scoring or engraving a line in the finished bore thereof.

Another object of the invention is to provide a cutter clamping structure which will effect the rigid securement of the blades within the holder during the operation of the tool.

Another object of the invention is to provide a holder which is designed to facilitate readjustment of the cutter blades without removal of the holder from the boring bar.

Other objects and advantages more or less ancillary of the foregoing and the manner in which all the various objects are realized will appear in the following description which, considered in connection with the accompanying drawings, sets forth the preferred embodiment of the invention.

Referring to the drawing:

Fig. 1 is an elevational view of a fragmentary portion of a boring bar showing the improved cutter holder mounted therein;

Fig. 2 is a transverse sectional view through the boring bar and cutter illustrated in Fig. 1, the section being taken on a plane indicated by the line 2—2 in Fig. 1;

Fig. 3 is a plan view of the improved floating reamer cutter holder;

Fig. 4 is an end elevational view thereof;

Fig. 5 is a sectional view through the cutter and holder illustrated in Fig. 3, the section being taken on the plane indicated by the line 6—6 in Fig. 3;

Fig. 6 is a sectional view of the improved holder, the section being taken on a plane indicated by the line 6—6 in Fig. 3;

Fig. 7 is a sectional view through the holder and cutter, the section being taken on the line 7—7 in Fig. 3;

Fig. 8 is a diagrammatic view of one of the cutter blades shown upon an enlarged scale and illustrating the position thereof in relation to the work piece, shown in dotted lines herein;

Fig. 9 is a sectional view shown upon an enlarged scale of one of the cutter blades;

Fig. 10 is a sectional view, shown upon an enlarged scale, of a fragmentary portion of the improved holder; and Fig. 11 is a line diagram of a portion of the holder and cutter, the cutter being indicated in dotted lines and shown in slightly exaggerated spaced relation with the holder in order to show the functional relation of certain parts of the assembly.

Referring to Fig. 1, the improved tool holder is illustrated as mounted within a boring bar 10 which, it will be understood, is merely illustrative of one of the types of tools within which the present invention may be incorporated. As is customary in floating reamers of this type, the bar is formed with an axial slot 11 slightly larger than the body of the holder, the walls of the bar defining the slot being cross drilled and tapped for the reception of a pin or taper shanked screw 12.

The holder comprises a body 13 formed with grooves 14 and 15 on the opposed sides thereof, the walls of the grooves being undercut to define flanges for the retention of the cutter blades 16 within the grooves. The outer corners of the rearward face of the block are drilled and tapped for the reception of set screws 17, which are directed inwardly toward the center of the holder for abutting engagement with the inner ends of the cutters 16 to facilitate the adjustment thereof. The body of the holder is designed so that the end portions thereof extend beyond the periphery of the boring bar within which the holder is mounted, thus facilitating adjustment of the set screws 17 without removal of the holder from the boring bar.

The cutter blades are machined with a ledge 18 in one of the side walls thereof, the opposed side 19 being beveled for engagement with the inclined flange in the groove and with a tapered land in a bushing 20 mounted in the holder body 13 (Fig. 5). The bushing 20 is drilled and tapped to receive a cap screw 21 for drawing the tapered face of the bushing 20 into engagement with the beveled wall of the cutter, thus forcing the blade laterally into impinged engagement with the undercut 22 in the holder and effecting impinged engagement of the flange 23 in the holder with the shoulder 24 defining the ledge 18 in the cutter blade 16.

It will be readily recognized that in surface grinding the cutter blade the edges thereof, which are swept by the grinding wheel as the work passes thereunder, for example, the corners 25, 26 and 27 (Fig. 9), will be formed in sharply defined angles, while the corners in the blade which are formed by the grinding wheel, such as the internal angle 28, will be of arcuate configuration despite the care and attention given to dressing the grinding wheel. Likewise in milling the slots 14 and 15 in the holder a sharply defined angle 29 (Fig. 10) will be formed in the corner of the flange 23 where the cutter sweeps the vertical wall of the holder but in the undercut portion 22 the internal angles 30 and 31 will be rounded. Thus, as illustrated in the diagram shown in Fig. 11, the sharp corners 26 and 27 of the cutter blade will engage and bite into the rounded corners 30 and 31 in the holder while the sharp angular corner 29 will be crowded into the rounded corner 28 in the cutter when the tapered face of the bushing 20 is drawn down upon the beveled face 19 of the cutter blade to effect the impinged engagement of the ledge 18 with the undercut portion of the holder.

The cutter blades 16 are circle ground to provide a land 32 in the ends thereof intermediate the rake and clearance faces 33 and 34. The blades are mounted in the holder in parallel relation with each other and in spaced parallel relation with a plane passing through the medial axis of the boring bar. The cutting edges of the blades are, moreover, disposed rearward such plane relative the direction of rotation of the bar. Thus, as will be seen in Fig. 8, no matter where the cutters come to rest when the tool is stopped during the operative cycle thereof the cylindrical wall of the work forward the blade is inclined from the cutting edge thereof as graphically illustrated by the dimension Y in Fig. 8. Consequently when the boring bar sags under its own weight as it comes to rest or drops due to the clearances in the guide bushing therefor, the blades will move towards the plane of the axis Z—Z of the work and along the arcuate wall of the cylinder. During such movement the weight of the bar is borne by the lands 32 which are of sufficient width to prevent the cutting edge thereof from scoring the surface of the work or engraving the line therein as the tool is withdrawn longitudinally from the cylindrical bore.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

A floating reamer comprising a holder having grooves in the opposed faces thereof, one of the walls defining one of said grooves being beveled inwardly, the opposed wall thereof having an undercut therein defining a channel of rectangular transverse section with rounded corners and an overhanging flange of rectangular transverse section with sharp corners, cutter blades in said grooves, one of the walls of said blades being beveled and engaged in dove tailed relation with the beveled wall of said groove, a ledge of rectangular transverse section formed in the opposed wall of said blade, the outside corners thereof being sharp right angles, the corners at the junction of the ledges with the body of the cutter being round, said ledges being interengaged with the channels in said holder, and bushings having a flat beveled face thereon engaged with the beveled face of the cutter for forcing the sharp edges of the ledges of the cutters into the rounded corners of the grooves in the holder.

HERMAN BERG.